(No Model.)  2 Sheets—Sheet 1.
B. LOOMIS.
METHOD OF AND MEANS FOR THE MANUFACTURE OF BRICKS, &c.
No. 280,837.  Patented July 10, 1883.
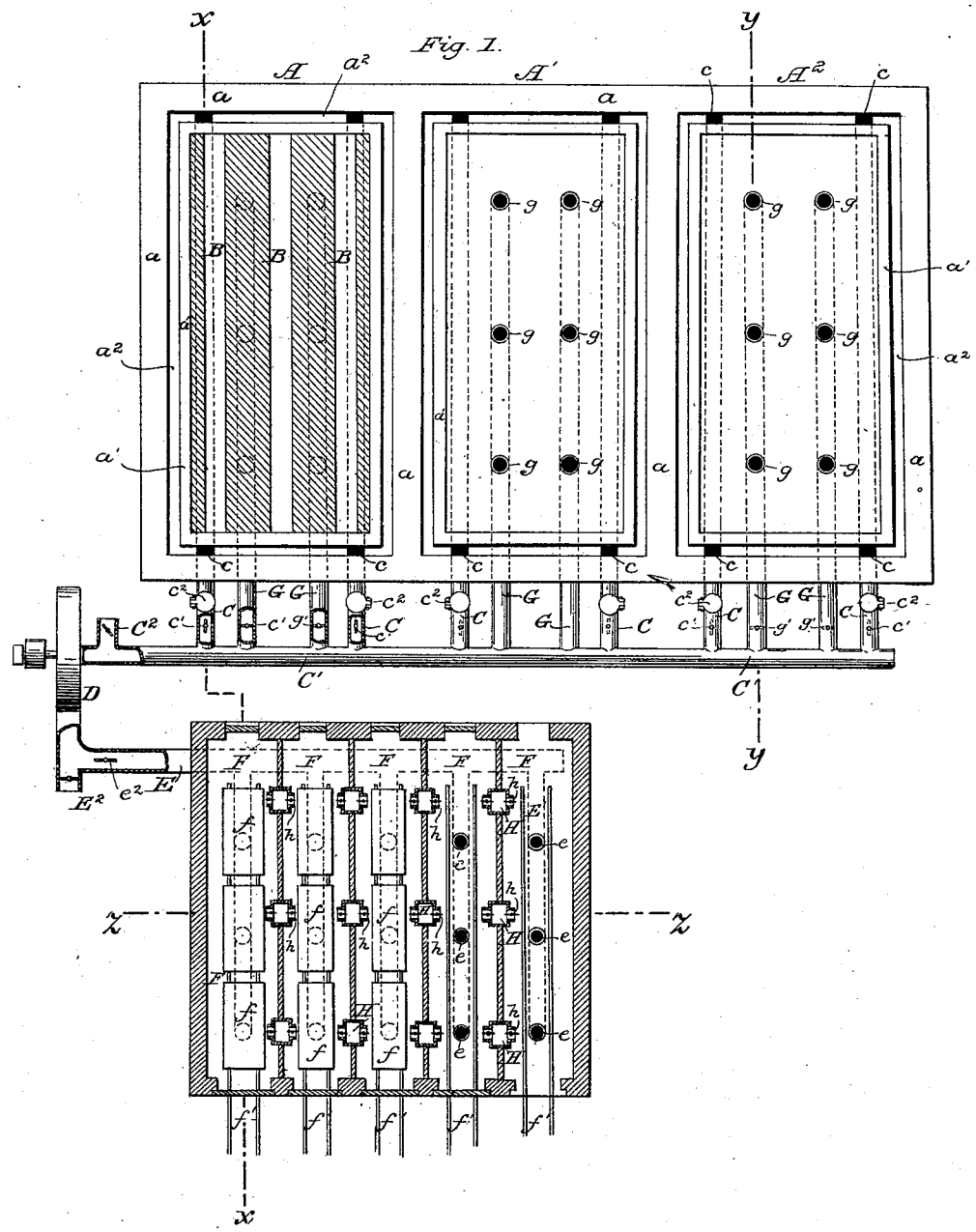

(No Model.) 2 Sheets—Sheet 2.
B. LOOMIS.
METHOD OF AND MEANS FOR THE MANUFACTURE OF BRICKS, &c.
No. 280,837. Patented July 10, 1883.
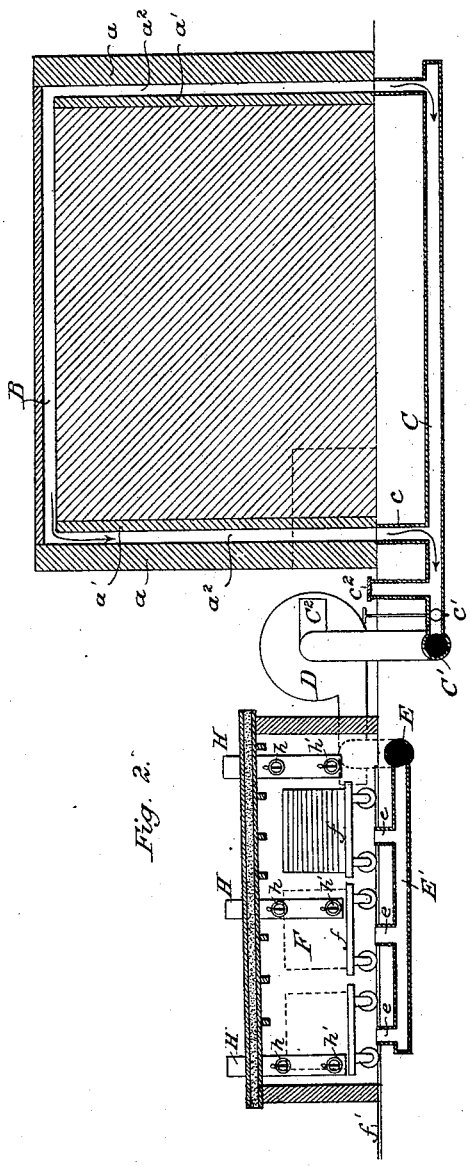
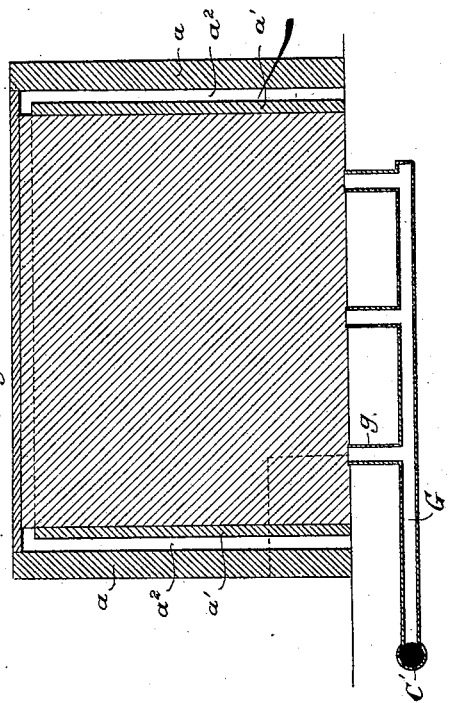
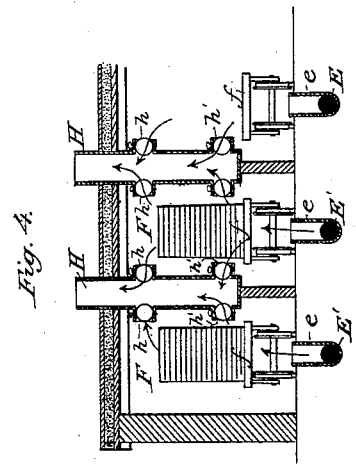
Witnesses:
C. C. Poole
F. U. Adams
Inventor:
Burdett Loomis
per M. E. Dayton
Attorney

UNITED STATES PATENT OFFICE.

BURDETT LOOMIS, OF HARTFORD, CONNECTICUT.

METHOD OF AND MEANS FOR THE MANUFACTURE OF BRICKS, &c.

SPECIFICATION forming part of Letters Patent No. 280,837, dated July 10, 1883.

Application filed November 6, 1882. (No model.)

*To all whom it may concern:*

Be it known that I, BURDETT LOOMIS, of Hartford, in the county of Hartford and State of Connecticut, have invented certain new and useful Improvements in Method of and Means for the Manufacture of Bricks and Similar Articles; and I do hereby declare that the following is a full, clear, and exact description thereof, reference being had to the accompanying drawings, and to the letters of reference marked thereon, which form a part of this specification.

This invention relates to the manufacture of bricks, tiles, pottery, and other articles made from clay and hardened by burning, and has for its objects, first, to effect a more perfect utilization of heat in drying and burning the articles; second, to more rapidly cool the articles after being burned, whereby the total period of manufacture is materially lessened.

To these ends the invention consists in the features of improvement, both in methods and construction, hereinafter set forth, and pointed out in the claims.

In the manufacture of bricks and other articles from clay or similar materials, said articles, after being given the requisite form, are usually first dried and thereafter "burned," or subjected to a high heat, for the purpose of driving off the chemically-contained water.

For that object which relates to the more perfect utilization of heat, the invention consists in the means for conducting the products of combustion or the heat of the products of combustion from the kiln to the drier after they have done their work in the kiln, as will be described.

For that object of my invention which relates to the more rapid cooling of the burned articles, the invention consists in means for forcibly passing a current of cold air through the kiln after the burning is completed, and, in furtherance of the first object above mentioned, the air thus passed through the kiln is conducted therefrom to the drying-chamber, being of course heated by contact with the objects in the kiln, so as to be of suitable temperature for use in drying another batch preparatory to burning.

In the drawings, Figure 1 is a plan view of a kiln having three compartments, one of which is represented as being filled with brick and the other two as empty, and also a series of drying-chambers in the neighborhood of the kiln. Fig. 2 is a vertical section through the kiln and drying-chamber above mentioned, taken upon line $x\ x$ of Fig. 1. Fig. 3 is a vertical cross-section taken on the line $y\ y$ of Fig. 1. Fig. 4 is a vertical section of a portion of the drying-chambers on line $z\ z$ of Fig. 1.

In the drawings the kiln is represented, having three chambers, A, A', and A², and is composed of thick outer walls, $a$, and inner walls, $a'$, with a vertical passage, $a^2$, between such walls on all sides of the kiln. The space $a^2$ is for the downward passage of heated air and products of combustion, and may be made by leaving a space between the bricks and the outer wall, $a$, when said bricks are piled in the kiln, in which case the inner wall, $a'$, as a special structure, will be unnecessary. The bricks are stacked in the kiln in the customary manner, with small spaces between them, and at the top of the kiln cross-passages B B are formed, which communicate with said spaces and with the side passages, $a^2$. A layer of closely-laid bricks is placed over these passages B and the whole upper surface of the kiln, so as to form a substantially-tight covering. The lower portions of the passages $a^2$ are connected by means of short pipes $c$ to horizontal pipes or flues C, usually laid under the kiln. The pipes C are connected at the front of the kiln to a large flue or pipe, C', which connects at one end to the inlet of an exhaust-fan, D, driven by steam or other suitable power. The outlet of the exhaust-fan D is connected to a pipe, E, which traverses one end of a series of drying-chambers, F, and is provided with branches E' E' in each chamber, which deliver the contents of the pipe E thereto through short pipes $e$, placed at suitable intervals. The pipe E and cross-pipes E' are preferably laid beneath the floor of the drying-chambers, and the delivery-pipes $e$ extend upwardly through the floor of such chambers. A second system of pipes, G, is laid under the kiln, of which, in the drawings, two are shown to each compartment, and said pipes open into the bottom of the kilns by means of short vertical pipes $g$. The series of pipes G also connect with the large pipe C', communicating with the exhaust-blower D, as above described. A valved opening, E², is also provided in the pipe E, by which the latter may discharge into the open air or into a vertical flue or chimney, and a valve, e², is located in the pipe E, beyond the valve E², which will be closed when the latter is open. The pipes C are provided with valves c', and between the latter and the kiln are also provided with valved openings c², communicating with the open air, or with other connections, by which they may, when occasion requires, be made to admit cold air. The pipes G are also provided with valves g'.

When the bricks have been laid in the kiln preparatory to burning, in the manner described, and the fires have been started therein, the action of the exhaust-fan D will be to draw the hot air and gases through the loosely-piled bricks into the cross flues or passages B and downwardly through the vertical passage a² into the pipe C and cross-pipe C'. During this operation the valves g' in the pipes G are closed. The heated air and gases thus drawn through the kiln are driven by the exhaust-fan into the pipe E, and either into the drying-chambers through the branches of said pipe or into the open air through the opening at E²—that is to say, when it is desired to draw off the gases or combustion products calculated to discolor the bricks for the second above-mentioned purpose of my invention, the valve e² is closed and the valve E² is opened, and, conversely, when it is desired to force the heated fluids from the kiln into the drying-chamber for the first above-mentioned object of my invention—to wit, the utilization of heat from the kiln for primarily drying the bricks—the valve E² is opened and the valve e² is closed. When the operation of burning the brick is completed, the valves c' are closed and the valves g' are opened, giving communication between the interior of the kiln and the exhaust-fan through the pipes G. The action of the fan will now be to draw off the heated air from the kiln and to force the same into the drying-chamber; and to fully utilize the heat present in the bricks for this purpose, and also to rapidly cool the bricks, the valves c² may be opened, so as to pass a cold or cooling current of air through the entire mass by the same passages through which the products of combustion were drawn during the action of burning, but in a reverse direction. By the means described both the burning and the cooling are made more uniform throughout the entire extent of the kiln, resulting in the production of a much larger proportion of perfect brick and in hastening their completion. The furnace-doors may be closed or partially opened in the cooling operation, according to the necessity for exposing one part or another of the latter to a greater or less action of cold air.

For the purpose of regulating the temperature of the heated fluids forced from the kiln into the drying-chambers by the means described, a cold-air register, C², is provided in the pipe C', near the fan, which may be opened more or less when and as desired.

The drying-chambers F are preferably constructed of only sufficient height and width to receive small platform-cars f, which are placed upon tracks f', laid therein, so that green bricks placed thereon will be near the top of the chamber and receive the full effects of the heat. The hot air is received at the floor of the drying-chamber underneath the cars from the inlet-pipes e, and the surplus air escapes through exit-pipes H H, which are placed in the thin partition-walls F' between the chambers F, and communicate with the chambers on either side. The pipes H H are provided with openings h h' near the top of the chambers and at some distance below it, which have valves or dampers, so as to regulate the escape of air, as shown in Fig. 4. The outside walls of the series of chambers F are preferably constructed of brick and the inner partitions of wood, and its roof is also preferably composed of wood covered with a layer of ashes, over which is a layer of cement, such construction being calculated to prevent the escape of heat from the drying-chambers.

Instead of using the exhaust-fan D to draw the hot air from the kiln and force it into the drying-chambers, the same result may be obtained by connecting the outlets H of the drying-chambers to the flue of an adjacent stack or chimney, by which sufficient draft may be obtained to draw the heated gases or hot air from the kiln into and through the drying-chambers.

Instead of connecting the pipes C directly with the interior spaces of the kiln, as illustrated and above set forth, the kiln may discharge the combustion products directly into the open air, and pipes may be arranged over the kiln and in the outflow current of such products, so as to be heated thereby. One end of said pipes being in communication with the open air and the other with the pipes C or passages a², heat may be conveyed to the drying-chamber, as in the arrangement and construction shown. Though the heat of the kiln will in this case be less perfectly utilized for drying purposes, much will be saved over the ordinary wasteful methods, wherein separate fires are employed for the kiln and drying-chambers. This construction may be employed advantageously in the manufacture of fine brick, pottery, &c., where the utmost care is required to avoid discoloration in all stages of manufacture.

I claim as my invention—

1. The combination, with a kiln, a drying-chamber, and an exhaust-fan, of flues C and G, connecting, respectively, with the top and bottom of the kiln, and with the inlet-opening of the said exhaust-fan, and a flue connecting the fan with the drying-chamber, substantially as described.

2. The combination, with a kiln and drying-chamber, of vertical passages a² in the kiln, communicating with the interior of the kiln at its top, flues C, connecting with the bottom of said passages $a^2$, and exhausting devices connected to said flues C and to the drying-chamber, substantially as and for the purpose set forth.

3. The combination, with a brick-kiln and fan, of pipes or flues C and G, connecting, respectively, with the top and bottom of the kiln, and a cross-flue, C', substantially as shown and described.

4. In a brick-kiln, the combination of outlet-pipes G, passages within the kiln, pipes C, provided with openings communicating with the outer air, and means for forcibly inducing a current of air through said openings, through the passages within the kiln, and outwardly through the pipes G, substantially as described.

5. In combination with a kiln and drying-chamber and a pipe or pipes connecting the kiln and chamber, a suction-fan located in said pipe and a valved opening between the fan and drying-chamber, whereby the aeriform contents of the kiln may be discharged either into the drying-chamber or into the outer air, substantially as described.

6. In combination with a kiln, a main pipe, C', a suction-fan applied to said pipe, a branch pipe, C, provided with valves $c'$ and $c^2$, and a pipe, G, provided with a valve, $g'$, arranged and operating substantially as described, and for the purposes set forth.

7. In combination with a brick-kiln and drying-chamber, and means for transferring heat from the kiln to the drying-chamber, outlet-flues H H in said drying-chamber, provided with dampers $h\ h'$, substantially as and for the purpose set forth.

In testimony that I claim the foregoing as my invention I affix my signature in presence of two witnesses.

BURDETT LOOMIS.

Witnesses:
M. E. DAYTON,
JESSE COX, Jr.